United States Patent [19]

Bedzyk

[11] Patent Number: 5,751,500
[45] Date of Patent: May 12, 1998

[54] ZOOM LENS MECHANISM WITH FOCUS CAMMING MECHANISM

[75] Inventor: Mark David Bedzyk, Rochester, N.Y.

[73] Assignee: Eastman Kodak Company, Rochester, N.Y.

[21] Appl. No.: 688,600

[22] Filed: Jul. 30, 1996

[51] Int. Cl.⁶ ............................................ G02B 9/00
[52] U.S. Cl. .................... 359/740; 359/700; 359/823
[58] Field of Search ............................ 359/739, 740, 359/828, 823, 699, 700

[56] References Cited

U.S. PATENT DOCUMENTS

| | | | |
|---|---|---|---|
| 4,226,520 | 10/1980 | Uesugi | 354/195 |
| 4,353,634 | 10/1982 | Himmelsbach | 354/195 |
| 4,389,098 | 6/1983 | Fukushima | 350/429 |
| 4,461,544 | 7/1984 | Isobe et al. | 350/429 |
| 4,506,959 | 3/1985 | Hama | 350/430 |
| 4,733,261 | 3/1988 | Gunshi et al. | 354/400 |
| 4,822,153 | 4/1989 | Tomori et al. | 350/429 |
| 4,834,514 | 5/1989 | Atsuta et al. | 350/429 |
| 4,841,323 | 6/1989 | Yamada et al. | 354/400 |
| 4,848,884 | 7/1989 | Enomoto | 350/429 |
| 4,965,615 | 10/1990 | Fujita et al. | 354/145.1 |
| 4,993,815 | 2/1991 | Yamazaki et al. | 350/429 |
| 5,018,843 | 5/1991 | Inadome et al. | 350/429 |
| 5,289,221 | 2/1994 | Yoon | 354/195.1 |
| 5,371,566 | 12/1994 | Asakura | 354/400 |
| 5,373,397 | 12/1994 | Satoh et al. | 359/699 |
| 5,376,984 | 12/1994 | Abe | 359/740 |

*Primary Examiner*—Georgia Y. Epps
*Assistant Examiner*—Thomas Robbins
*Attorney, Agent, or Firm*—Gordon M. Stewart; Charles E. Snee, III

[57] ABSTRACT

A zoom lens assembly (10) includes a plurality of cam barrels (18, 38, 66) which rotate together within non-rotating lens barrels (12, 34, 54) as the assembly is extended and contracted. A compact focusing mechanism (92–156) travels with the innermost cam barrel (66).

33 Claims, 8 Drawing Sheets

ZOOM LENS MECHANISM WITH FOCUS CAMMING MECHANISM

CROSS REFERENCE TO RELATED APPLICATION

This application discloses a mechanism for use in a zoom lens of a type disclosed in commonly assigned, copending U.S. application Ser. No. 08/661.537 filed Jun. 11, 1996. The disclosure of that application hereby is incorporated by reference into this application.

TECHNICAL FIELD

The invention concerns compact zoom lenses suitable for use in photographic cameras, xerographic copiers, and similar apparatus. More particularly, the invention is related to such lenses in which one of the lens groups is moveable independently of the others for fine adjustment of focus.

BACKGROUND OF THE INVENTION

Zoom lenses have been in use for many years. As photographic cameras and other apparatus using such lenses have become more compact, a need has arisen for zoom lenses which require less and less space. Often, zoom lenses have been driven by a motor located in the camera. Complex mechanisms have been driven by the motor, not only to extend the enclosing lens barrels from a short focal length position to a longer focal length position, but also to adjust the relative positions along the optical axis of at least some of the several lens groups within the zoom lens. In some zoom lenses, one of the lens groups has been provided with a device for fine adjustment of the group's position along the optical axis to sharply focus an image on the focal plane of the camera. Many such devices require use of a focusing motor which occupies considerable space within the lens. A need has existed for simplified, more compact mechanisms for zooming such lenses between desired nominal focal length positions and for focusing the lens at each nominal position.

SUMMARY OF THE INVENTION

A primary objective of the invention is to provide a more compact zoom lens mechanism, in which a plurality of lens barrels can be extended more fully than possible in known zoom lenses.

Another objective is to provide such a zoom lens mechanism in which precise extension and retraction of the lens can be achieved with a minimum of play among the zooming components.

Still another objective is to provide such a zoom lens mechanism in which the external lens barrels translate without rotating during zooming.

Yet another objective is to provide such a zoom lens mechanism with a compact mechanism for moving one lens group to focus the overall lens.

A further objective is to provide such a zoom lens mechanism with a focusing mechanism which can achieve repeatable, fine resolution for precise focusing.

A still further objective is to provide such a zoom lens mechanism which does not have threads for translating the barrels and lenses, thereby enabling use of less precise plastic molding techniques for making the parts of the mechanism.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

One embodiment of a zoom lens according to the invention may include an outer lens barrel fixed against rotation; a plurality of first axial slots on an inside surface of the outer lens barrel; an outer cam barrel mounted for rotation within the outer lens barrel; a corresponding plurality of first circumferentially and axially extended cam slots formed through a wall of the outer cam barrel; a second axial slot on an inside surface of the outer cam barrel; an inner lens barrel mounted for translation within the outer cam barrel; a circumferentially extended slot formed through the wall of the inner lens barrel; a corresponding plurality of first radially extended cam followers on the inner lens barrel, the first cam followers being extended through the first cam slots into the first axial slots; an inner lens support barrel mounted for rotation within and translation with the inner lens barrel; and a radially extended pin on the inner lens support barrel, the pin being extended through the circumferentially extended slot into the second axial slot. As a result of this arrangement, upon rotation of the outer cam barrel, the inner lens barrel is moved axially within the outer cam barrel due to camming between the first cam followers, the first cam slots, and the first axial slots; and the outer cam barrel and inner lens support barrel rotate together due to engaging between the radially extended pin and the second axial slot. Additional pairs of lens barrels and cam barrels may be cascaded in this fashion.

The zoom lens may further include a corresponding plurality of third axial slots on an inside surface of the inner lens barrel; a corresponding plurality of second circumferentially and axially extended cam slots formed through a wall of the inner lens support barrel; a lens group; and a corresponding plurality of second radially extended cam followers on the lens group, the second cam followers being extended through the second cam slots into the third axial slots. As a result of this arrangement, when the outer cam barrel and inner lens support barrel rotate, the lens group is moved axially within the inner lens support barrel due to camming between the second cam followers, the second cam slots and the third axial slots.

The zoom lens has an optical axis and may also include a mechanism for focusing the overall zoom lens by moving the lens group mentioned in the preceding paragraph. The same focusing mechanism also can be used in other types of zoom lenses. This is achieved by providing a frame for the lens group, the frame having a first aperture centered on the optical axis; a lens support ring having a second aperture centered on the optical axis for receiving the lens group, the lens support ring having a diameter less than a diameter of the first aperture; at least one circumferentially and axially extended cam surface on the support ring; at least one radially extended stop on the support ring for engaging the frame to limit axial movement of the support ring along the optical axis; at least one radially extended cam follower on the lens group, the cam follower being engaged with the at least one cam surface; a flexure supported on the frame for holding the cam follower against the cam surface; a gear sector on the support ring; and a drive motor supported on the frame, the motor having an output pinion engaged with the gear sector. Thus, rotation of the pinion rotates the gear sector and support ring, causing movement of the cam follower along the cam surface and movement of the one lens group along the optical axis toward or away from the frame.

The mechanism for focusing also may include a pair of axially extended and circumferentially spaced stops on the frame for engaging the radial stop on the support ring at limits of rotation of the support ring. The cam follower on the lens group may be extended between another pair of axially and circumferentially extended stops to prevent rotation of the lens group with the support ring. A radially extended slot may be provided in the frame into which the cam follower on the lens group can move as the one lens group moves toward the frame. In one embodiment, there are three of the radially extended stops on the support ring, three of the cam followers on the lens group, and three pairs of axially extended and circumferentially spaced stops on the frame, one pair of stops for each cam follower on the lens group; adjacent axially extended stops for adjacent cam followers on the lens group being positioned to engage a corresponding radially extended stop on the support ring at limits of travel of the support ring. The cam surfaces on the support ring may be helical. The lens support ring and the circumferentially and axially extended cam surface on the support ring may extend at least partially into the first aperture when the radially extended stop engages the frame, whereby the lens group can move at least partially into the first aperture to provide a very compact structure in the retracted position of the lens. The lens support ring may include a stop flange extended radially and circumferentially into the second aperture for limiting axial movement the lens group.

The invention provides various advantages. The retracted lens is quite compact and the lens barrels can extend to a great portion of their full length. The zooming mechanism has a small degree of play, thereby improving reliability and repeatability. All of the rotating components of the zoom lens mechanism are within the translating, non-rotating lens barrels. Compactness of the lens mechanism is enhanced by the internal focusing mechanism which has a thin profile. High resolution focusing can be achieved repeatably.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

Referring to FIGS. 1 to 7, the skilled person will understand the various features of a zoom lens assembly 10 in accordance with the invention. An outer lens barrel 12 includes a radially outwardly extended mounting flange 14 which in the familiar manner can be attached to a camera body, not illustrated. At a front end opposite mounting flange 14, lens barrel 12 includes a radially inwardly extended flange 16 which may support a light seal, not illustrated. At an end adjacent mounting flange 14, a concentric cam barrel 18 includes a radially outwardly and circumferentially extended flange 20, to which is attached or on which is formed a gear sector 22, shown in FIGS. 5 and 7. A zoom motor 24 is mounted on a front surface of mounting flange 14 to drive an output pinion 26, visible in FIGS. 1, 2, 5 and 7, which drives a gear train 28 having an output pinion 30 meshed with gear sector 22.

Cam barrel 18 includes a trio of circumferentially and axially extended cam slots 32 which pass through the wall of the barrel. Essentially, cam slots 32 are spiral in geometry, in the familiar manner. Within cam barrel 18 is located a central lens barrel 34 having a radially inwardly extended flange 36 which may support a light seal, not illustrated. A concentric cam barrel 38 includes a radially outwardly and circumferentially extended retaining flange 40 which engages a rear edge of lens barrel 34. A trio of equally spaced, radially outwardly extended cam follower pins 42 are attached to lens barrel 34. See FIGS. 3, 5, and 7. Each pin 42 extends through a respective one of cam slots 32 into one of a trio of equally spaced, axially extended grooves 44 provided in the inside surface of outer lens barrel 12. Thus, when motor 24 rotates outer cam barrel 18, slots 32 cause pins 42 to slide along grooves 44 to translate lens barrel 34 and cam barrel 38 as a unit from the position of FIG. 1 to that of FIGS. 2 to 7, and vice versa. By having three cam follower pins 42 which closely engage three cam slots 32 and three axially extended grooves 44, lens barrel 34 is constrained to move essentially concentrically within lens barrel 12 and is supported against tilting. This enables lens barrel 34 to be extended to nearly its full length from lens barrel 12. The degree of axial extension is limited essentially only by structure required to support pins 42 on lens barrel 34 and the structure required for flange 16.

Figure 4:
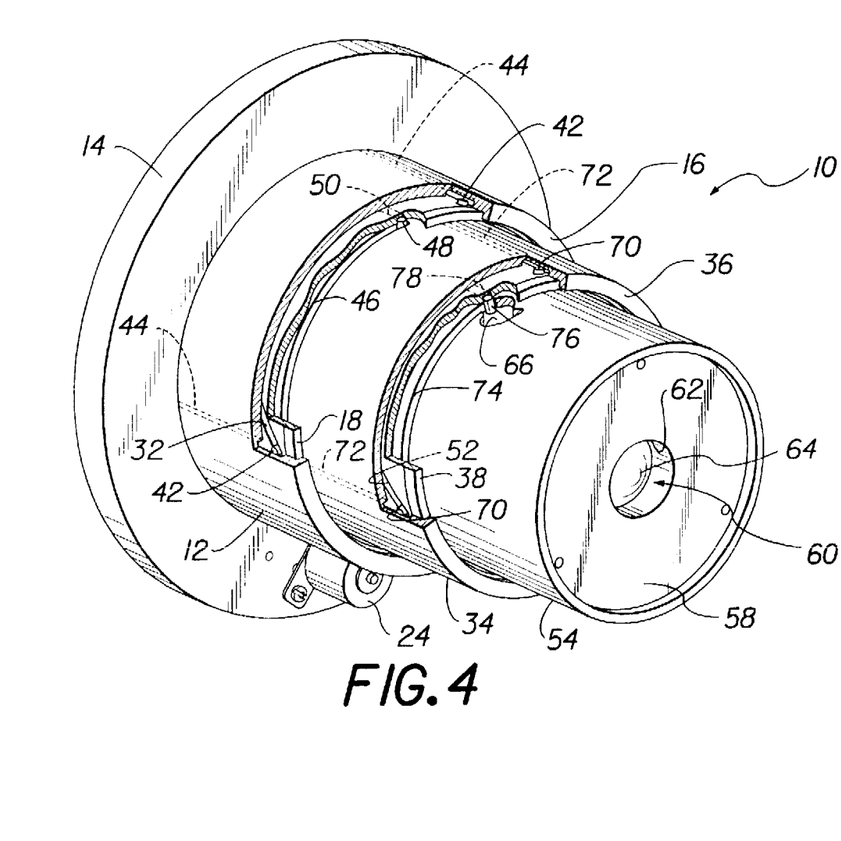
FIG. 4 shows a front perspective, partially broken away view of the zoom lens of FIG. 2, taken from an opposite side of the zoom lens compared to FIG. 3.
Figure 5:
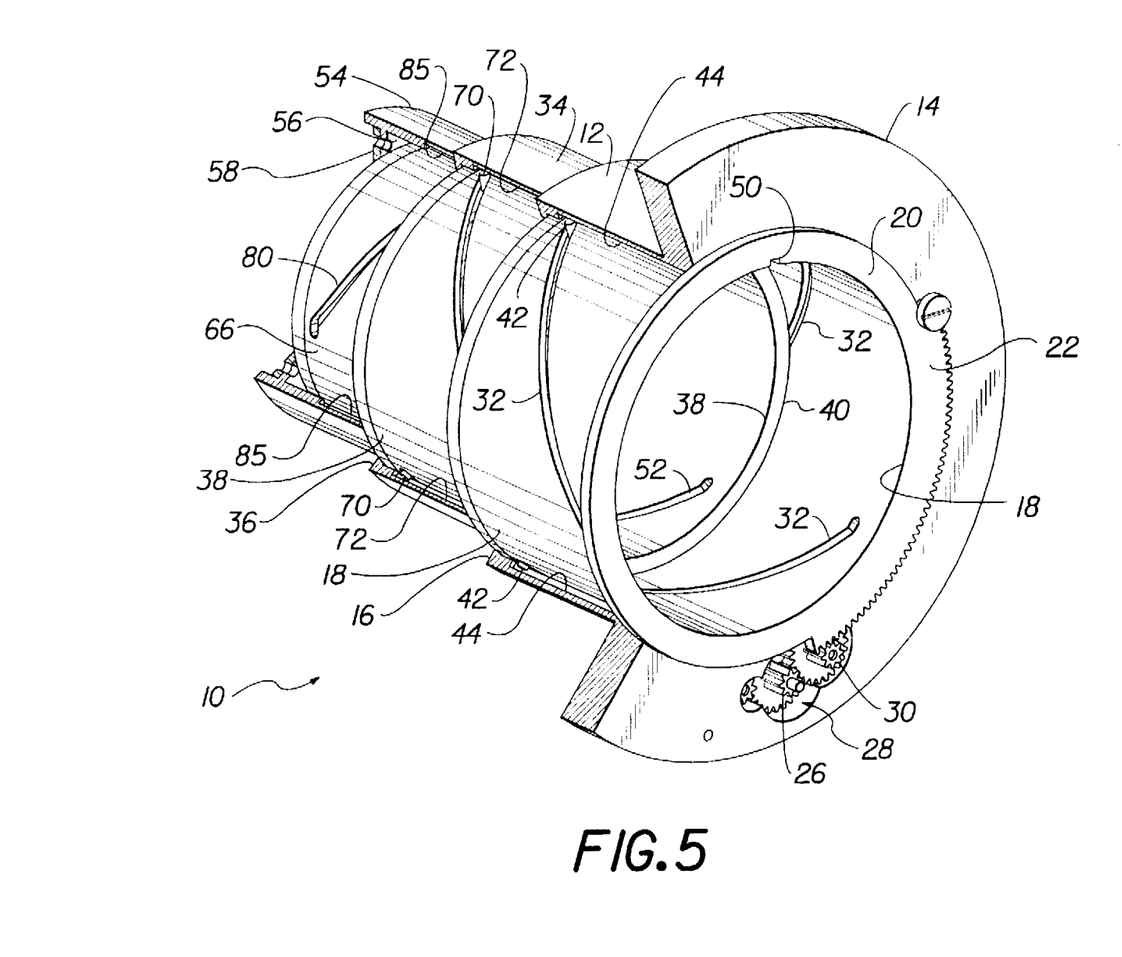
FIG. 5 shows a rear perspective, partially broken away view of the zoom lens of FIG. 2, taken from the same side of the zoom lens as in FIG. 3.
Figure 6:
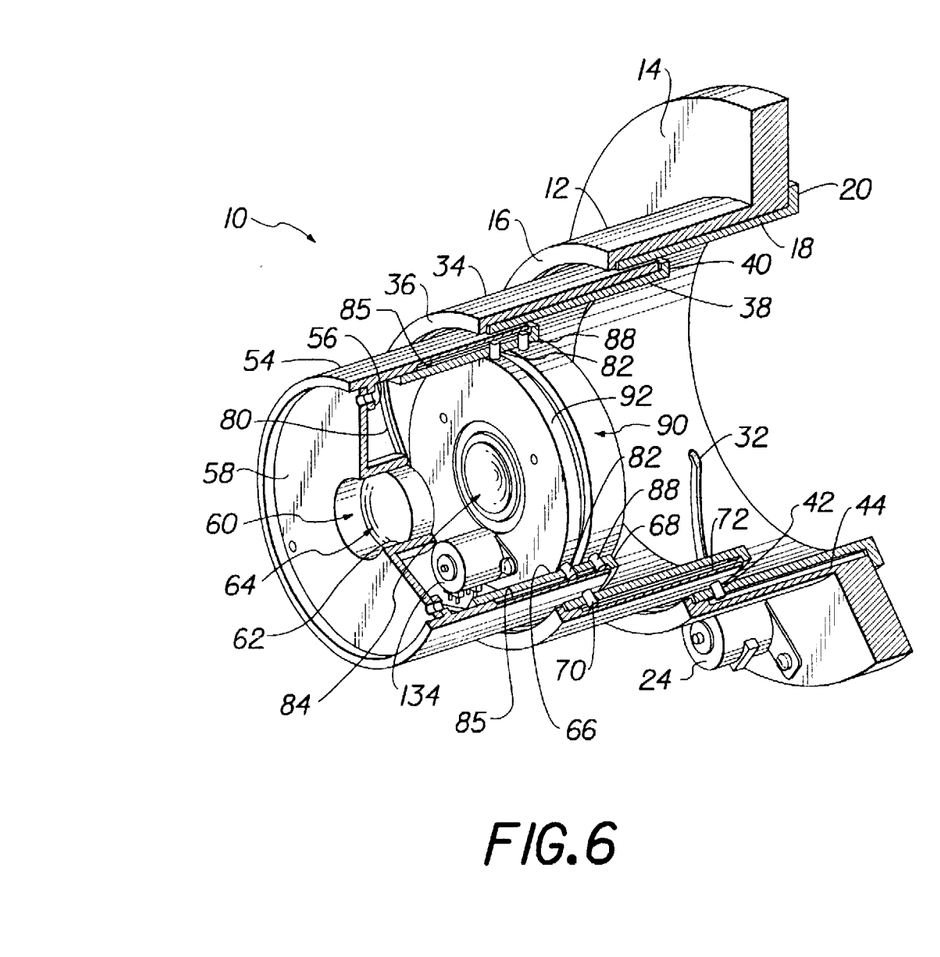
FIG. 6 shows a front perspective, partially broken away view of the zoom lens of FIG. 2, taken from the same side of the zoom lens as in FIG. 3.
Figure 7:
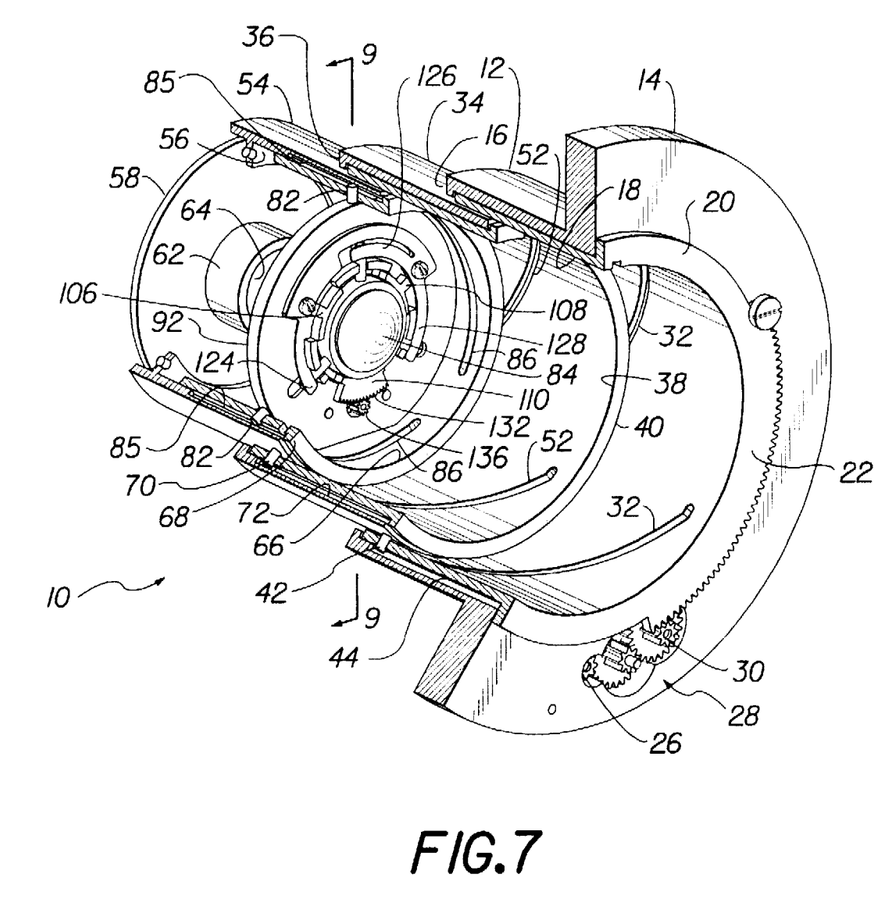
FIG. 7 shows a rear perspective, partially broken away view of the zoom lens of FIG. 2, taken from the same side of the zoom lens as in FIGS. 3, 5 and 6, with the rear lens group removed for ease of illustration.

As seen in FIG. 4, a single circumferentially extended slot 46, having an arcuate extent about the same as that of gear sector 22, passes through the wall of lens barrel 34. Attached to cam barrel 38 is a single radially outwardly extended pin 48, which extends through slot 46 into an axially extended groove 50 provided in the inside surface of cam barrel 18. Thus, cam barrels 18 and 38 will rotate together while lens barrel 34 and cam barrel 38 translate as a unit.

Cam barrel 38 includes a trio of circumferentially and axially extended cam slots 52 which pass through the wall of the barrel. Essentially, cam slots 52 have the same geometry as cam slots 32, though on a smaller radius. Within cam barrel 38 is located an inner lens barrel 54 having a radially inwardly extended mounting flange 56 to which is attached a lens support disk 58 having a central aperture 60.

A rearwardly extended cylindrical wall 62 surrounds aperture 60 and provides a fixed mount for a front lens group 64.

Within lens barrel 54, an inner cam barrel 66 is mounted for rotation. Cam barrel 66 includes a radially outwardly and circumferentially extended retaining flange 68 which engages a rear edge of lens barrel 54. A trio of equally spaced, radially outwardly extended cam follower pins 70 are attached to lens barrel 54. See FIGS. 3, 4, and 5. Each pin 70 extends through a respective one of cam slots 52 into one of a trio of equally spaced, axially extended grooves 72 provided in the inside surface of central lens barrel 34. Thus, when motor 24 rotates outer cam barrel 18 and central cam barrel 38, slots 52 cause pins 70 to slide along grooves 72 to translate lens barrel 54 and cam barrel 66 as a unit from the position of FIG. 1 to that of FIGS. 2 to 7, and vice versa. Concentric movement and support against tilting are achieved in the manner previously described.

As seen in FIG. 4, a single circumferentially extended slot 74, also having an arcuate extent about the same as that of gear sector 22, passes through the wall of lens barrel 54. Attached to cam barrel 66 is a single radially outwardly extended pin 76, which extends through slot 74 into an axially extended groove 78 provided in the inside surface of cam barrel 38. Thus, cam barrels 18, 38 and 66 will rotate together while lens barrel 34 and cam barrel 38, and lens barrel 54 and cam barrel 66, translate as respective units.

Cam barrel 66 includes toward its front end a trio of circumferentially and axially extended cam slots 80 which pass through the wall of the barrel. A corresponding trio of radially outwardly extended cam follower pins 82 extend through slots 80 from a central lens group 84. See FIGS. 6 and 7. Pins 82 extend further into a trio of axially extended grooves 85 provided on an inside surface of lens barrel 54. Cam barrel 66 also includes toward its rear end a further trio of circumferentially and axially extended cam slots 86 which pass through the wall of the barrel. A corresponding trio of radially outwardly extended cam follower pins 88 extend through slots 86 from a rear lens group 90. Again see FIG. 6. Pins 88 also extend into grooves 85. Thus, when cam barrel 66 rotates with cam barrels 18 and 38, cam slots 80 and 86 cause cam follower pins 82 and 88, respectively, to move along grooves 85 to move lens groups 84 and 90 from the position of FIG. 1 to that of FIGS. 2 to 7, and vice versa.

Figure 1:
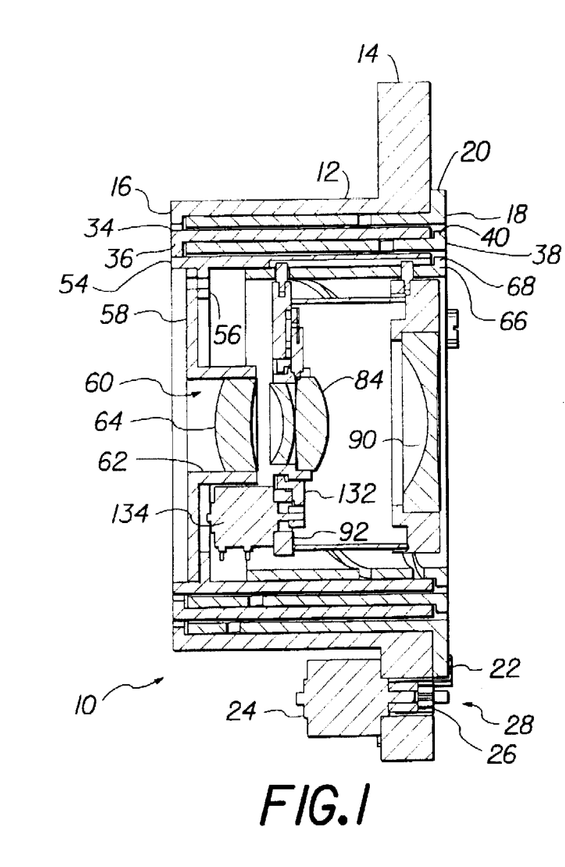
FIG. 1 shows a sectional view along a centerline of a zoom lens in accordance with the invention, with the lens retracted to a configuration for shorter focal length.
Figure 2:
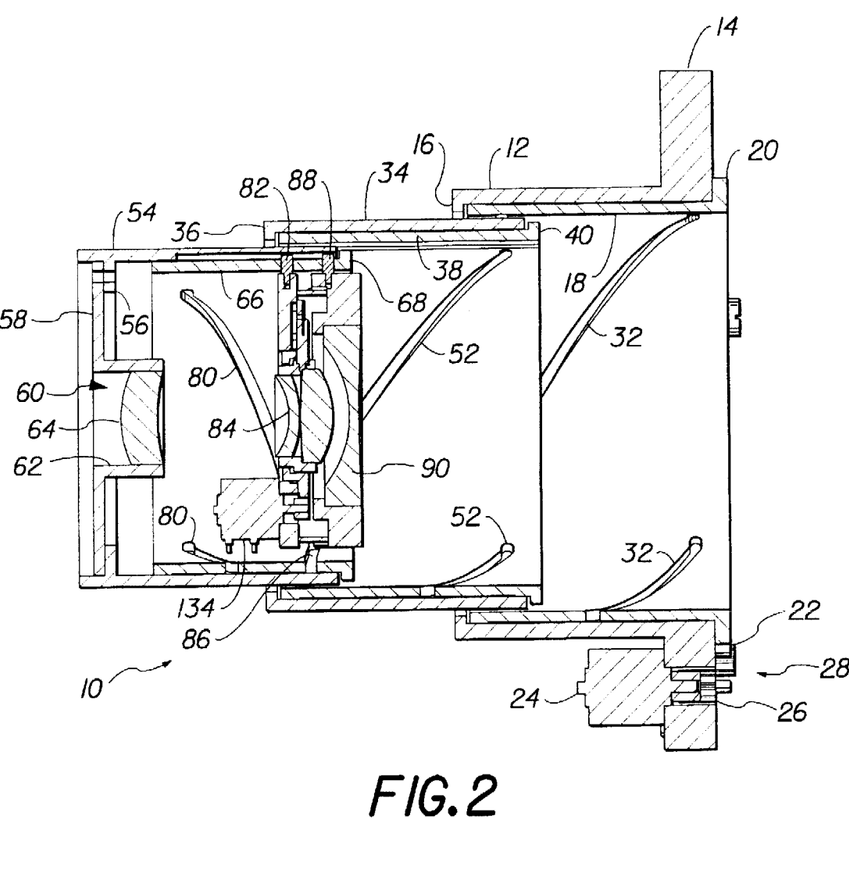
FIG. 2 shows the zoom lens of FIG. 1, with the lens extended to a configuration for longer focal length.
Figure 3:
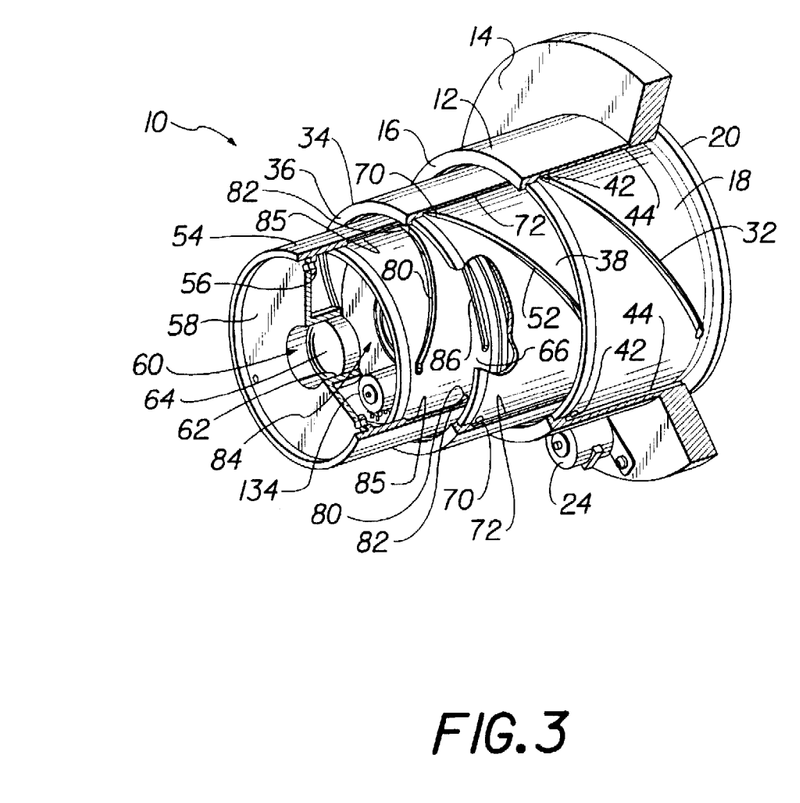
FIG. 3 shows a front perspective, partially broken away view of the zoom lens of FIG. 2.

FIGS. 6 to 9 show how central lens group 84 may be mounted for adjusting the focus of the overall zoom lens. Cam follower pins 82 are equally spaced around an essentially flat, annular frame 92 having a central aperture 94 located on the optical axis of assembly 10. A lens support ring 96 having a central aperture 98 for lens group 84 is positioned concentrically within aperture 94. A trio of circumferentially and axially extended cam surfaces 100, 102, 104 are provided on support ring 96. Essentially, the cam surfaces form segments of spirals which, for example, may allow for total axial travel of lens group 84 relative to frame 92 of a couple of millimeters or so, which is sufficient for focusing. By locating support ring 96 within aperture 94, cam surfaces 100, 102, 104 may be extended axially into aperture 94, thus permitting the needed axial travel of lens group 84 within an axial distance not much larger than the axial thickness of frame 92 and providing a very compact focusing lens mechanism. Extended radially from support ring 96 are a trio of radial stops 106, 108, 110 which engage a back surface 112 of the support ring to limit axial movement of lens group 84. A retainer ring 114 surrounds the lens group and supports a trio of radially outwardly extended cam follower pins 116, 118, 120 which ride on respective cam surfaces 100, 102, 104. To maintain engagement between the cam follower pins and the cam surfaces, a C-shaped flexure 122 is provided, the flexure including circumferentially extended, cantilevered leaf springs 124, 126, 128 which engage the cam follower pins. A pair of fasteners 130 extend through flexure 122 and an arcuate spacer 131 to attach the flexure to frame 92. A gear sector 132 is formed on or attached to radial stop 110. On the front side of frame 92 is mounted a focus motor 134 having an output pinion 136 which engages gear sector 132. Thus, rotation of pinion 136 will cause support ring 96 to rotate and move cam surfaces 100, 102, 104 relative to cam follower pins 116, 118, 120, thereby causing lens group 84 to move back or forth, as needed to achieve focus. As shown in FIG. 1, focus motor 134 slips into position next to cylindrical wall 62 in the retracted configuration of the lens, thus providing a very compact structure.

Figure 8:
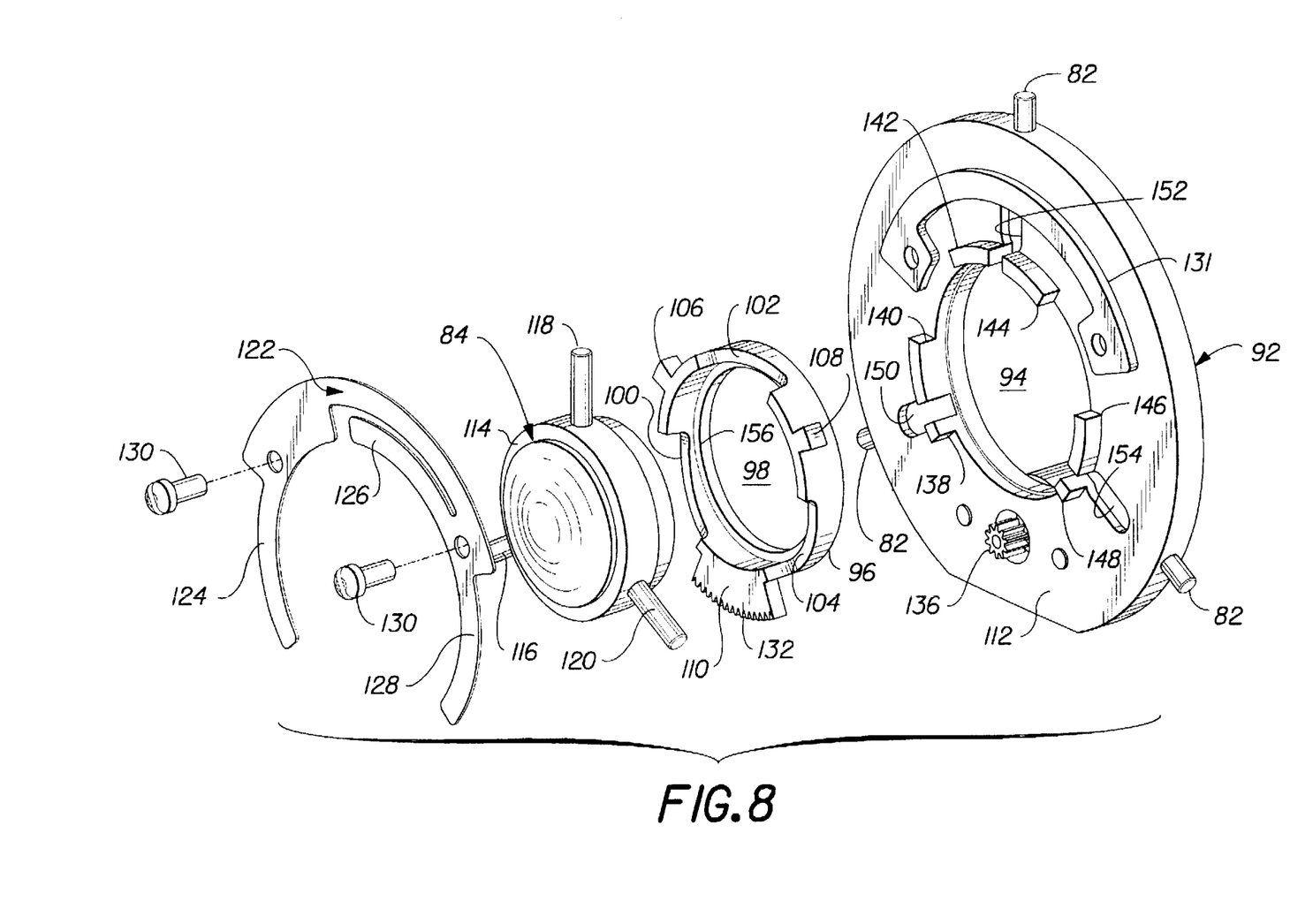
FIG. 8 shows an exploded rear perspective view of a focus adjusting mechanism in accordance with the invention.
Figure 9:
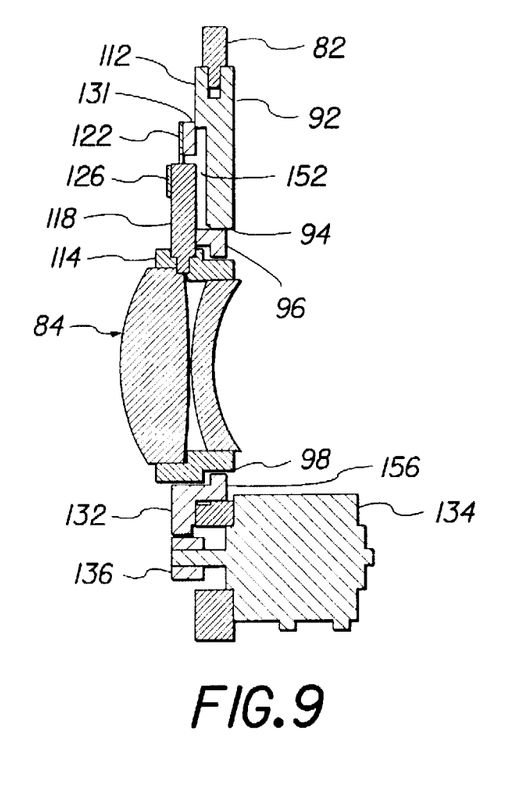
FIG. 9 shows a sectional view along a centerline of the mechanism of FIG. 8 and along line 9—9 of FIG. 7.

To prevent rotation of lens group 84 with support ring 96, pairs of axially extended, circumferentially spaced stops 138, 140; 142, 144; 146, 148 are provided on frame 92 around aperture 94. Thus, pin 116 is positioned between stops 138, 140; pin 118, between stops 142, 144; and pin 120, between stops 146, 148. Rotational movement of support ring 96 is limited by different pairs of the same stops. That is, radial stop 106 is positioned between stops 140, 142; stop 108, between stops 144, 146; and stop 110, between stops 138, 148. To enable pins 116, 118 and 120 to overlap somewhat with frame 92 and provide a more compact structure, radial grooves 150, 152, 154 may be provided into back surface 112. Alternatively, grooves 150, 152, 154 may be extended axially to form slots through the thickness of frame 92. Within aperture 98, a radially inwardly extended flange 156 limits movement of lens group 84 through support ring 96.

| Parts List | |
|---|---|
| 10 ... zoom lens assembly | 20 ... radially outward retaining flange |
| 12 ... outer lens barrel | |
| 14 ... radially outward mounting flange | 22 ... gear sector |
| | 24 ... zoom motor |
| 16 ... radially inward flange | 26 ... output pinion |
| 18 ... outer cam barrel | 28 ... gear train |
| 30 ... output pinion | 85 ... three axial grooves inside 54 |
| 32 ... three spiral cam slots through 18 | 86 ... three spiral cam slots through 66 |
| 34 ... central lens barrel | 88 ... three radially outward cam followers from 90 |
| 36 ... radially inward flange | |
| 38 ... central cam barrel | 90 ... rear lens group |
| 40 ... radially outward retaining flange | 92 ... annular frame supporting 82 |
| | 94 ... central aperture in 92 |
| 42 ... three radially outward cam followers from 34 | 96 ... lens support ring |
| | 98 ... aperture in 96 |
| 44 ... three axial grooves inside 12 | 100, 102, 104 ... three spiral ramps on 96 |
| 46 ... single circumferential slot through 34 | 106, 108, 110 ... radially extended stops on 96 |
| 48 ... single radial pin from 38 through 46 | 112 ... rear face of 92 |
| | 114 ... retainer ring for 84 |
| 50 ... single axial groove inside 18 | 116, 118, 120 ... three radially outward cam followers from 114 |
| 52 ... three spiral cam slots through 38 | 122 ... C-shaped flexure |
| 54 ... inner lens barrel | 124, 126, 128 ... leaf springs extended from 122 |
| 56 ... radially inward retaining flange | 130 ... fasteners |
| | 131 ... arcuate spacer |
| 58 ... support disk | 132 ... gear sector extended from 110 |
| 60 ... central aperture | |
| 62 ... rearwardly projected circular wall | 134 ... focus motor |
| | 136 ... output pinion meshed with 132 |
| 64 ... front lens group | |
| 66 ... inner cam/lens barrel | 138, 140; 142, 144; 146, 148 ... axially extended, |
| 68 ... radially outward retaining | |

-continued

Parts List

| | |
|---|---|
| flange | circumferentially spaced |
| 70 . . . three radially outward cam followers from 54 | stops to engage 106, 108, 110 and 116, 118, 120 |
| 72 . . . three axial grooves inside 34 | 150, 152, 154 . . . radial slots in 92 to receive 116, 118, 120 |
| 74 . . . single circumferential slot through 54 | 156 . . . radially inward stop flange in 94 to engage 114 |
| 76 . . . single radial pin from 66 through 74 | |
| 78 . . . single axial groove inside 38 | |
| 80 . . . three spiral cam slots through 66 | |
| 82 . . . three radially outward cam followers from 84 | |
| 84 . . . central lens group | |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A zoom lens includes a plurality of lens groups arranged along an optical axis and means for moving the lens groups relative to one another to change the overall focal length of the lens and is characterized by:

a frame for one of the lens groups, the frame having a first aperture centered on the optical axis;

a lens support ring having a second aperture centered on the optical axis for receiving the one lens group, the lens support ring having an outer diameter less than an inner diameter of the first aperture and the lens support ring being rotatably extended at least partially into the first aperture;

at least one circumferentially and axially extended cam surface on the support ring;

at least one radially extended stop on the support ring for engaging the frame to limit axial movement of the support ring along the optical axis into the first aperture;

at least one radially extended cam follower on the one lens group, the cam follower being engaged with the at least one cam surface;

the second aperture having an inner diameter greater than an outer diameter of the one lens group and the one lens group being extended at least partially into the second aperture;

a flexure supported on the frame for holding the cam follower against the cam surface;

a gear sector on the support ring; and a drive motor supported on the frame, the motor having an output pinion engaged with the gear sector, whereby rotation of the pinion rotates the gear sector and support ring relative to the frame, causing movement of the cam follower along the cam surface and movement of the one lens group along the optical axis toward or away from the second aperture and the frame.

2. A zoom lens according to claim 1, further characterized by:

a pair of axially extended and circumferentially spaced stops on the frame for engaging the radial stop on the support ring at limits of rotation of the support ring.

3. A zoom lens according to claim 1, further characterized by:

a pair of axially extended and circumferentially spaced stops on the frame, the cam follower being extended between the stops to prevent rotation of the one lens group with the support ring.

4. A zoom lens according to claim 3, further characterized by:

a radially extended slot in the frame into which the cam follower can move as the one lens group moves toward the frame.

5. A zoom lens according to claim 3, wherein there are three of the radially extended stops on the support ring, three of the cam followers, and three pairs of axially extended and circumferentially spaced stops on the frame, one pair of stops for each cam follower; adjacent axially extended stops for adjacent cam followers being positioned to engage a corresponding radially extended stop on the support ring at limits of travel of the support ring.

6. A zoom lens according to claim 1, wherein the cam surface is helical.

7. A zoom lens according to claim 1, wherein the lens support ring and the circumferentially and axially extended cam surface extend at least partially into the first aperture when the radially extended stop engages the frame, whereby the one lens group can move at least partially into the first aperture.

8. A zoom lens according to claim 7, wherein the lens support ring comprises a flange extended radially and circumferentially into the second aperture for limiting axial movement of the one lens group.

9. A zoom lens, comprising:

an outer lens barrel fixed against rotation;

a plurality of first axial slots on an inside surface of the outer lens barrel;

an outer cam barrel mounted for rotation within the outer lens barrel;

a corresponding plurality of first circumferentially and axially extended cam slots formed through a wall of the outer cam barrel;

a second axial slot on an inside surface of the outer cam barrel;

an inner lens barrel mounted for translation within the outer cam barrel;

a circumferentially extended slot formed through the wall of the inner lens barrel;

a corresponding plurality of first radially extended cam followers on the inner lens barrel, the first cam followers being extended through the first cam slots into the first axial slots;

an inner lens support barrel mounted for rotation within and translation with the inner lens barrel;

a radially extended pin on the inner lens support barrel, the pin being extended through the circumferentially extended slot into the second axial slot, whereby upon rotation of the outer cam barrel, the inner lens barrel is moved axially within the outer cam barrel due to camming between the first cam followers, the first cam slots and the first axial slots; and the outer cam barrel and inner lens support barrel rotate together due to engaging between the radially extended pin and the second axial slot.

10. A zoom lens according to claim 9, further comprising:

a corresponding plurality of third axial slots on an inside surface of the inner lens barrel;

a corresponding plurality of second circumferentially and axially extended cam slots formed through a wall of the inner lens support barrel;

a lens group;

a corresponding plurality of second radially extended cam followers on the lens group, the second cam followers being extended through the second cam slots into the third axial slots, whereby when the outer cam barrel and inner lens support barrel rotate, the lens group is moved axially within the inner lens support barrel due to camming between the second cam followers, the second cam slots and the third axial slots.

11. A zoom lens according to claim 10 wherein the lens has an optical axis, further comprising:

a frame for the lens group, the frame having a first aperture centered on the optical axis;

a lens support ring having a second aperture centered on the optical axis for receiving the lens group, the lens support ring having an outer diameter less than an inner diameter of the first aperture and the lens support ring being rotatable extended at least partially into the first aperture;

at least one circumferentially and axially extended cam surface on the support ring;

at least one radially extended stop on the support ring for engaging the frame to limit axial movement of the support ring along the optical axis into the first aperture;

at least one radially extended cam follower on the lens group, the cam follower being engaged with the at least one cam surface;

the second aperture having an inner diameter greater than an outer diameter of the one lens group and the one lens group being extended at least partially into the second aperture;

a flexure supported on the frame for holding the cam follower against the cam surface;

a gear sector on the support ring; and a drive motor supported on the frame, the motor having an output pinion engaged with the gear sector, whereby rotation of the pinion rotates the gear sector and support ring, causing movement of the cam follower along the cam surface and movement of the one lens group along the optical axis toward or away from the second aperture and the frame.

12. A zoom lens according to claim 11, further characterized by:

a pair of axially extended and circumferentially spaced stops on the frame for engaging the radial stop on the support ring at limits of rotation of the support ring.

13. A zoom lens according to claim 11, further characterized by:

a pair of axially extended and circumferentially spaced stops on the frame, the cam follower on the lens group being extended between the stops to prevent rotation of the lens group with the support ring.

14. A zoom lens according to claim 13, further characterized by:

a radially extended slot in the frame into which the cam follower on the lens group can move as the one lens group moves toward the frame.

15. A zoom lens according to claim 13, wherein there are three of the radially extended stops on the support ring, three of the cam followers on the lens group, and three pairs of axially extended and circumferentially spaced stops on the frame, one pair of stops for each cam follower on the lens group; adjacent axially extended stops for adjacent cam followers on the lens group being positioned to engage a corresponding radially extended stop on the support ring at limits of travel of the support ring.

16. A zoom lens according to claim 11, wherein the cam surface on the support ring is helical.

17. A zoom lens according to claim 11, wherein the lens support ring and the circumferentially and axially extended cam surface on the support ring extend at least partially into the first aperture when the radially extended stop engages the frame, whereby the lens group can move at least partially into the first aperture.

18. A zoom lens according to claim 17, wherein the lens support ring comprises a stop flange extended radially and circumferentially into the second aperture for limiting axial movement the lens group.

19. A zoom lens includes a plurality of lens groups arranged along an optical axis and means for moving the lens groups relative to one another to change the overall focal length of the lens and is characterized by:

a frame for one of the lens groups, the frame having a first aperture centered on the optical axis;

a lens support ring having a second aperture centered on the optical axis for receiving the one lens group, the lens support ring having a diameter less than a diameter of the first aperture;

at least one circumferentially and axially extended cam surface on the support ring;

at least one radially extended stop on the support ring for engaging the frame to limit axial movement of the support ring along the optical axis;

at least one radially extended cam follower on the one lens group, the cam follower being engaged with the at least one cam surface;

the lens support ring and the circumferentially and axially extending cam surface extending at least partially into the first aperture when the radially extended stop engages the frame, whereby the one lens group can move at least partially into the first aperture;

a flexure supported on the frame for holding the cam follower against the cam surface;

a gear sector on the support ring; and a drive motor supported on the frame, the motor having an output pinion engaged with the gear sector, whereby rotation of the pinion rotates the gear sector and support ring, causing movement of the cam follower along the cam surface and movement of the one lens group along the optical axis toward or away from the frame.

20. A zoom lens according to claim 19, further characterized by:

a pair of axially extended and circumferentially spaced stops on the frame for engaging the radial stop on the support ring at limits of rotation of the support ring.

21. A zoom lens according to claim 19, further characterized by:

a pair of axially extended and circumferentially spaced stops on the frame, the cam follower being extended between the stops to prevent rotation of the one lens group with the support ring.

22. A zoom lens according to claim 21, further characterized by:

a radially extended slot in the frame into which the cam follower can move as the one lens group moves toward the frame.

23. A zoom lens according to claim 21, wherein there are three of the radially extended stops on the support ring, three of the cam followers, and three pairs of axially extended and circumferentially spaced stops on the frame, one pair of stops for each cam follower; adjacent axially extended stops for adjacent cam followers being positioned to engage a corresponding radially extended stop on the support ring at limits of travel of the support ring.

24. A zoom lens according to claim 19, wherein the cam surface is helical.

25. A zoom lens according to claim 19, wherein the lens support ring comprises a flange extended radially and circumferentially into the second aperture for limiting axial movement of the one lens group.

26. A zoom lens, comprising:

an outer lens barrel fixed against rotation;

a plurality of first axial slots on an inside surface of the outer lens barrel;

an outer cam barrel mounted for rotation within the outer lens barrel;

a corresponding plurality of first circumferentially and axially extended cam slots formed through a wall of the outer cam barrel;

a second axial slot on an inside surface of the outer cam barrel;

an inner lens barrel mounted for translation within the outer cam barrel;

a circumferentially extended slot formed through the wall of the inner lens barrel;

a corresponding plurality of first radially extended cam followers on the inner lens barrel, the first cam followers being extended through the first cam slots into the first axial slots;

an inner lens support barrel mounted for rotation within and translation with the inner lens barrel;

a radially extended pin on the inner lens support barrel, the pin being extended through the circumferentially extended slot into the second axial slot, whereby upon rotation of the outer cam barrel, the inner lens barrel is moved axially within the outer cam barrel due to camming between the first cam followers, the first cam slots and the first axial slots; and the outer cam barrel and inner lens support barrel rotate together due to engaging between the radially extended pin and the second axial slot;

a frame for the lens group, the frame having a first aperture centered on the optical axis;

a lens support ring having a second aperture centered on the optical axis for receiving the lens group, the lens support ring having a diameter less than a diameter of the first aperture;

at least one circumferentially and axially extended cam surface on the support ring;

at least one radially extended stop on the support ring for engaging the frame to limit axial movement of the support ring along the optical axis;

at least one radially extended cam follower on the lens group, the cam follower being engaged with the at least one cam surface;

the lens support ring and the circumferentially and axially extending cam surface extending at least partially into the first aperture when the radially extended stop engages the frame, whereby the one lens group can move at least partially into the first aperture;

a flexure supported on the frame for holding the cam follower against the cam surface;

a gear sector on the support ring; and a drive motor supported on the frame, the motor having an output pinion engaged with the gear sector, whereby rotation of the pinion rotates the gear sector and support ring, causing movement of the cam follower along the cam surface and movement of the one lens group along the optical axis toward or away from the frame.

27. A zoom lens according to claim 26, further comprising:

a corresponding plurality of third axial slots on an inside surface of the inner lens barrel;

a corresponding plurality of second circumferentially and axially extended cam slots formed through a wall of the inner lens support barrel;

a lens group;

a corresponding plurality of second radially extended cam followers on the lens group, the second cam followers being extended through the second cam slots into the third axial slots, whereby when the outer cam barrel and inner lens support barrel rotate, the lens group is moved axially within the inner lens support barrel due to camming between the second cam followers, the second cam slots and the third axial slots.

28. A zoom lens according to claim 26, further characterized by:

a pair of axially extended and circumferentially spaced stops on the frame for engaging the radial stop on the support ring at limits of rotation of the support ring.

29. A zoom lens according to claim 26, further characterized by:

a pair of axially extended and circumferentially spaced stops on the frame, the cam follower on the lens group being extended between the stops to prevent rotation of the lens group with the support ring.

30. A zoom lens according to claim 29, further characterized by:

a radially extended slot in the frame into which the cam follower on the lens group can move as the one lens group moves toward the frame.

31. A zoom lens according to claim 29, wherein there are three of the radially extended stops on the support ring, three of the cam followers on the lens group, and three pairs of axially extended and circumferentially spaced stops on the frame, one pair of stops for each cam follower on the lens group; adjacent axially extended stops for adjacent cam followers on the lens group being positioned to engage a corresponding radially extended stop on the support ring at limits of travel of the support ring.

32. A zoom lens according to claim 26, wherein the cam surface on the support ring is helical.

33. A zoom lens according to claim 26, wherein the lens support ring comprises a stop flange extended radially and circumferentially into the second aperture for limiting axial movement the lens group.

* * * * *